(12) United States Patent
Sugahara et al.

(10) Patent No.: US 6,732,212 B2
(45) Date of Patent: May 4, 2004

(54) LAUNCH RAW PACKET ON REMOTE INTERRUPT

(75) Inventors: Hirohide Sugahara, Kawasaki (JP); Takashi Miyoshi, San Jose, CA (US); Jeffrey D. Larson, San Jose, CA (US); Takeshi Horie, Palo Alto, CA (US)

(73) Assignee: Fujitsu Limited, Kawasaki (JP)

( * ) Notice: Subject to any disclaimer, the term of this patent is extended or adjusted under 35 U.S.C. 154(b) by 667 days.

(21) Appl. No.: 09/785,071

(22) Filed: Feb. 14, 2001

(65) Prior Publication Data

US 2002/0120800 A1 Aug. 29, 2002

(51) Int. Cl.[7] .......................... G06F 13/32; G06F 15/16
(52) U.S. Cl. ................... 710/268; 709/217; 709/236
(58) Field of Search ............... 710/260–269, 710/30; 709/217–219, 236

(56) References Cited

U.S. PATENT DOCUMENTS

| | | | | |
|---|---|---|---|---|
| 5,490,271 A | * | 2/1996 | Elliott et al. ............... | 710/268 |
| 5,842,026 A | * | 11/1998 | Wong-Chan et al. ........ | 710/260 |
| 6,170,025 B1 | * | 1/2001 | Drottar et al. .............. | 710/48 |
| 6,205,508 B1 | | 3/2001 | Bailey et al. ............... | 710/260 |
| 6,233,636 B1 | | 5/2001 | Kelley et al. | |
| 6,247,091 B1 | * | 6/2001 | Lovett ....................... | 710/260 |
| 6,658,521 B1 | * | 12/2003 | Biran et al. ................ | 710/315 |
| 6,684,281 B1 | * | 1/2004 | Sugahara et al. ........... | 710/260 |

OTHER PUBLICATIONS

Intel Corporation, "Getting Started with the 21554 Embedded PCI–to–PCI Bridge," Application Note, 14 pages, Sep. 1998.
Intel Corporation, "Getting Started with the 21554 Embedded PCI–to–PCI Bridge," Application Note, 14 pages, Order No. 278210–001, Sep. 1998.

* cited by examiner

Primary Examiner—Sumati Lefkowitz
(74) Attorney, Agent, or Firm—Fenwick & West LLP

(57) ABSTRACT

One embodiment of the present invention provides a method for processing a remote interrupt signal or a remote event. Another embodiment of the present invention provides a system for issuing a raw packet over a network in response to a remote interrupt or a remote event. Another embodiment of the present invention provides a network interface system configured to issue interrupt requests over a network.

22 Claims, 5 Drawing Sheets

LAUNCH RAW PACKET ON REMOTE INTERRUPT

RELATED APPLICATIONS

The present application relates to the subject matter of copending U.S. application Ser. No. 09/705,451, filed by Hirohide Sugahara, et al. on Nov. 2, 2000 (Atty Docket No. 4441).

FIELD OF INVENTION

This invention relates to remote interrupts, and more specifically, to issuing a raw packet over a network in response to a remote interrupt.

BACKGROUND OF THE INVENTION

An interrupt is a signal that notifies a host device or program that a particular event has occurred. When the host receives the interrupt signal, the host can take a specified action or can simply ignore the interrupt signal. Certain interrupt signals can be assigned a higher priority than other interrupt signals or processes. As such, a high priority interrupt signal can cause a lower priority process to temporarily suspend while the higher priority interrupt is processed. In short, interrupt signals can be generated by a hardware or software thereby indicating that some event has occurred. For an interrupt signal to serve its intended purpose, however, it must be received by a device that is capable of interpreting the interrupt and taking the corresponding action.

In a conventional computer system, interrupts generated by Input/Output devices (IO devices) or computer applications are generally handled by an interrupt controller and central processing unit (CPU) that are local to the interrupting device. The local host CPU responds to interrupt requests from each device type that is coupled to the local host bus. IO devices can be coupled to the interrupt controller by direct lines or by shared lines. The interrupt controller receives the interrupt requests and provides them to the CPU along with an interrupt number associated with the interrupt request. Thus, the processing of interrupt requests requires an intelligent host device that is local to the interrupting device, such as a host CPU.

This requirement for an intelligent device can be problematic. For example, consider a network environment having a remote node that only includes a number of unintelligent IO devices coupled to the network via a network interface card (NIC). Each IO device has a unique set of requirements for notifying the host CPU node of an interrupt request. As such, dedicated registers included in the remote NIC are used to store various parameters about each supported IO device. In this way, the remote NIC can be used to handle the remote interrupts.

However, each operation that an IO device performs can have a different set of interrupt parameters or requirements. Moreover, each IO device can have various is interrupt requirements that differ from the interrupt requirements of other IO devices of that node. Thus, the variety of IO devices and operations performed by each of those IO devices can require a significant amount of register space in the remote NIC. One solution to this problem is to simply limit the number of supported operations for each IO device. Such a solution, however, is not always desirable or practical. In addition, if an IO device's interrupt requirements are unknown or unclear, then the remote NIC cannot be configured for that device.

What is needed, therefore, is a technique for handling interrupts generated on a remote and unintelligent node. The technique should be flexible so as to accommodate a number of diverse interrupt requirements and a variety of interrupting devices and events.

BRIEF SUMMARY OF THE INVENTION

One embodiment of the present invention provides a method for processing a remote interrupt signal. The method includes receiving an interrupt signal from an interrupt signal source at a remote node. The method further includes selecting a raw packet based on the received interrupt signal, the raw packet including the identity of the interrupt signal source. The method further includes launching the selected raw packet over the network from the remote node to a host node.

Another embodiment of the present invention provides a system for issuing a raw packet over a network in response to a remote interrupt. The system includes a host node including a processing unit. The host node is operatively coupled to the network, and is for receiving an issued raw packet. This embodiment of the system further includes a remote node including a network interface module and an interrupt signal source. The network interface module is for issuing a raw packet based on an interrupt signal received from the interrupt signal source. The raw packet includes an identity of the interrupt signal source.

Another embodiment of the present invention provides a network interface system. The network interface system includes a raw packet buffer for storing a number of raw packets, each raw packet containing an identity of a corresponding interrupt signal source. In response to an interrupt signal source providing an interrupt signal to the network interface system, the network interface system issues the corresponding raw packet to a host node via a network.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
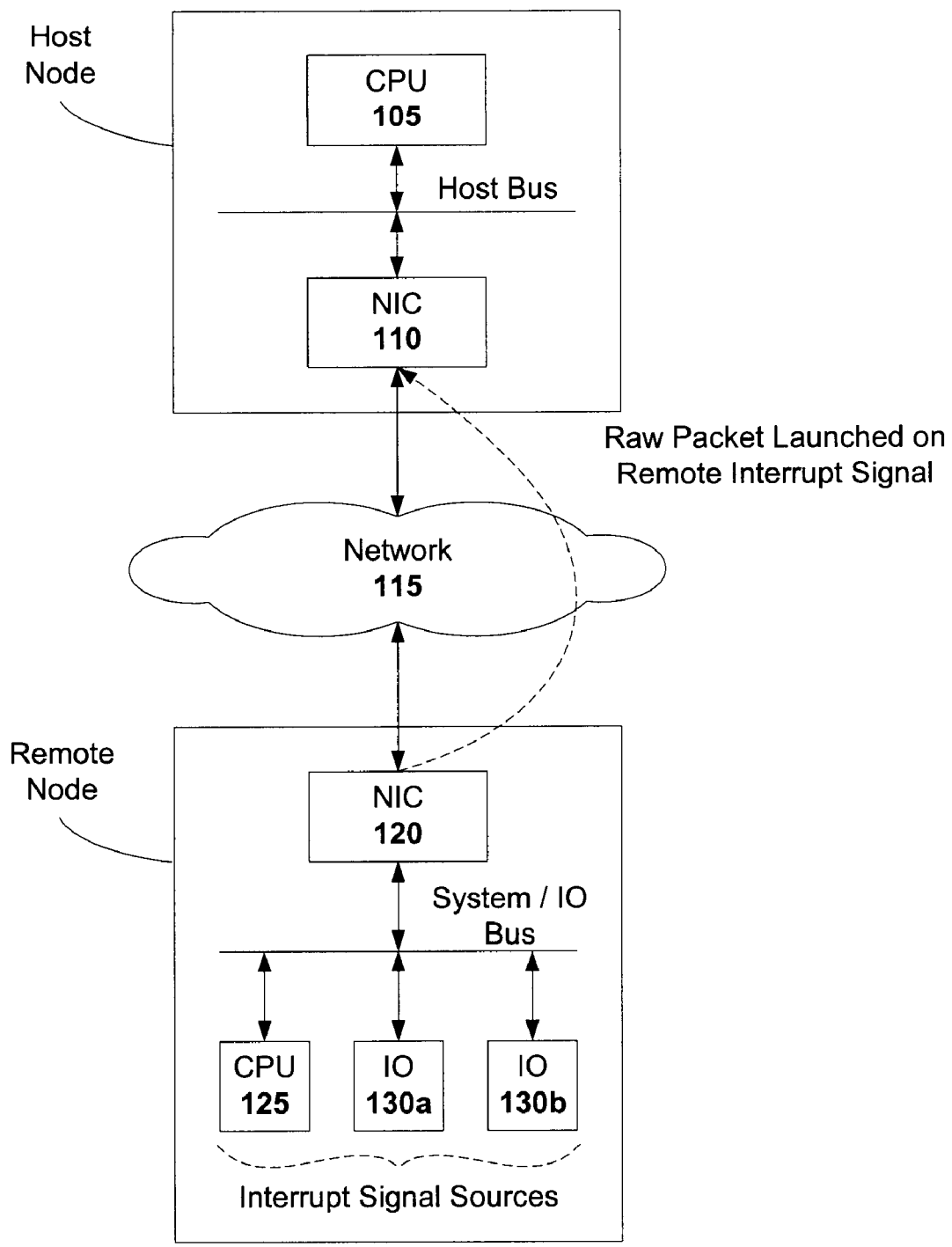
FIG. 1 is a block diagram of a system for launching a raw packet in response to a remote interrupt in accordance with one embodiment of the present invention.

FIG. 1 is a block diagram of a system capable of launching a raw packet in response to a remote interrupt in accordance with one embodiment of the present invention. The system includes a host node coupled to a remote node via a network 115. The host node includes a central processing unit (CPU) 105 that is operatively coupled to a network interface card (NIC) 110 by a host bus. The remote node, on the other hand, includes a NIC 120 that is operatively coupled to a CPU 125 and a number of input/output (IO) devices 130 (e.g., 130a and 130b) by the likes of a system bus or an IO bus. Each of the devices included in the remote node can generate an interrupt signal, whether it be a hardware interrupt or a software interrupt.

Note that alternative embodiments may be configured differently, and the present invention is not intended to be limited to any one particular embodiment or configuration. For instance, the remote node need not include CPU 125, or may include more than one CPU 125. In addition, there may be any number of nodes coupled to network 115. In one embodiment, the remote node includes a single IO device 130 that has the functionality of network card 120 integrated therein. The host bus of the host node, as well as the system/IO bus of the host node can be a peripheral component interconnect (PCI) bus or other conventional bus technology. Other embodiments and configurations will be apparent in light of this disclosure.

In general, an event occurs at the remote node that triggers an interrupt signal to be generated. The source of the interrupt signal can be from any of the devices included in the remote node. This interrupt signal might be generated, for example, by a program being executed by CPU 125, where the program requires CPU 105 of the host node to do something such as provide data to the program. Similarly, the interrupt signal can be generated by an IO device 130 such as a printer that received a print request but is currently out of paper. There are numerous other reasons why an interrupt signal could be generated by the likes of CPU 125 or IO devices 130. Generally, interrupts can be generated by errors, operation completion (e.g., direct memory access completion), or other special events.

Regardless of the reason that an interrupt signal is generated, the host node (e.g., CPU 105) must be made aware of the interrupt so that responsive action can be taken. If the interrupt is not communicated to the host node, then it will simply be ignored as if the interrupt was never generated—a likely undesirable result. In the embodiment shown, NIC 120 responds to an interrupt signal generated by one of the interrupt signal sources by issuing or "launching" a raw packet that is prepared in advance by the host node. The raw packet can specify, for example, the address of the processing host device, the identity of the device or event associated with the generated interrupt signal, and other pertinent information that the host might need in processing the interrupt request. For example, the raw packet might also include information about the interrupting device or status codes associated with the interrupting device.

The raw packet can be prepared by host software, hardware, firmware or any combination thereof during an initial system configuration session, or when a new interrupt signal source (e.g., CPU 125, IO device 130 or some event) is added to the system. Once the raw packet is prepared, it is then communicated to the corresponding remote node (e.g., NIC 120) and stored. In the embodiment shown, the prepared raw packets are stored in a buffer included in NIC 120. When one of the remote interrupt signal sources generates an interrupt signal, that signal is received by NIC 120.

Note that the interrupt signal can be manifested in a number of ways, such as in the form of an electrical signal (e.g., logical high or low signal) or the occurrence of an event (e.g., the expiration of a timer). NIC 120 responds to the interrupt signal by issuing the raw packet that corresponds to that particular interrupt signal. This raw packet is transferred over network 115, and received by the host node. The host node (e.g., CPU 105) can then interrogate the raw packet, assess the associated interrupt request, and take responsive action.

Figure 2A:
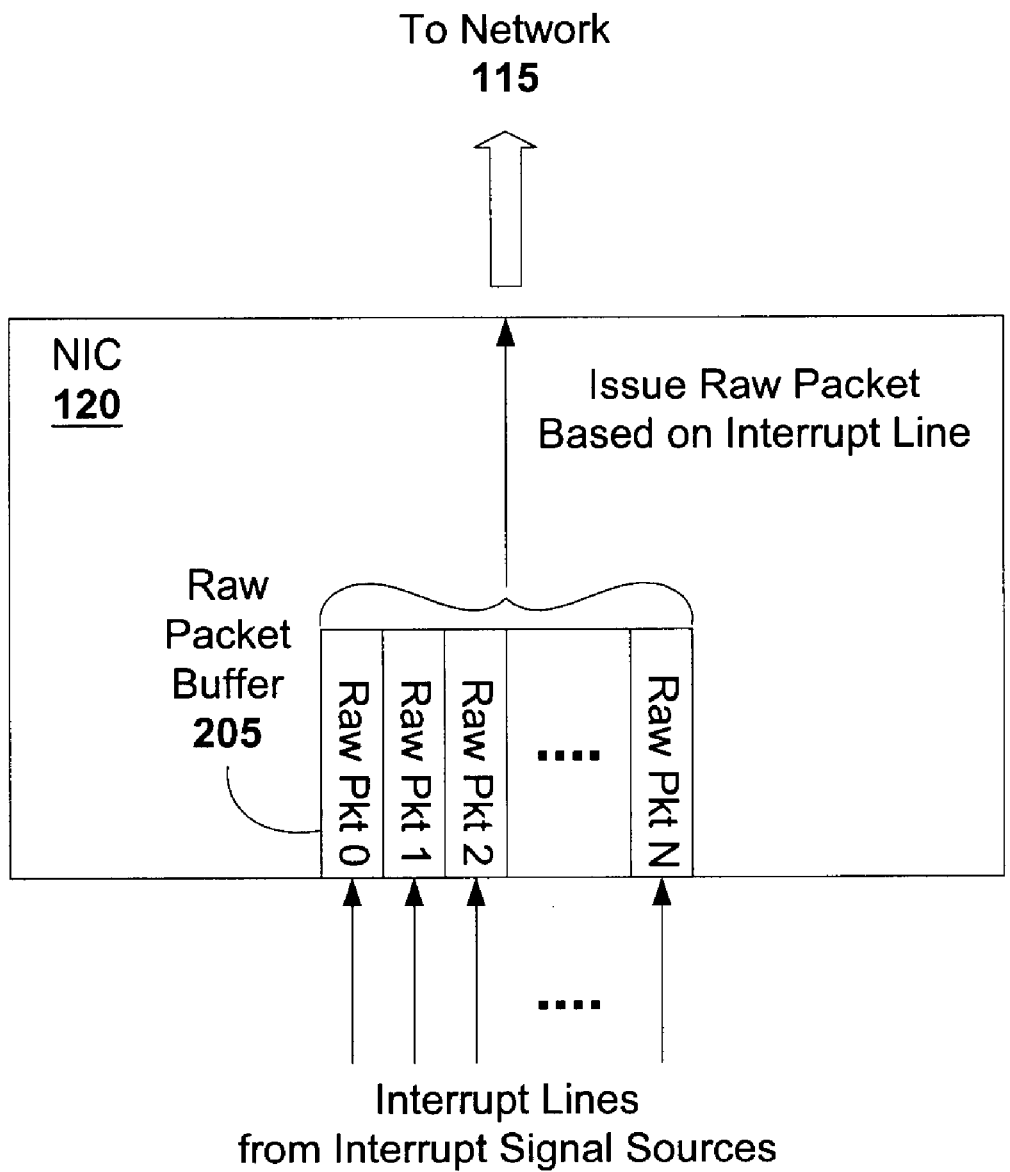
FIG. 2a is a general block diagram of a remote network interface system in accordance with one embodiment of the present invention.

FIG. 2a is a general block diagram of a remote network interface system in accordance with one embodiment of the present invention. As can be seen, this embodiment of NIC 120 includes a raw packet buffer 205. This raw packet buffer 205 includes a number of raw packets (e.g., raw pkt 0, raw pkt 1, raw pkt 2, etc.). Each of these raw packets is associated with a particular interrupt line, and each interrupt line is associated with a particular interrupt signal source (e.g., IO device 130, CPU 135 or an event). In response to an interrupt line going active, the associated raw packet is issued to network 115. As previously indicated, the raw packets stored in raw packet buffer 205 are prepared in advance during the likes of a system configuration session and then provided to NIC 120 for storage in raw packet buffer 205.

In one embodiment, raw packet buffer 205 is implemented with static random access memory (SRAM). However, other memory means can be employed to effect raw packet buffer 205. For example, raw packet buffer 205 can be implemented with dynamic random access memory. Alternatively, raw packet buffer 205 can be implemented with non-volatile memory such as a flash memory chip or an electronic erasable programmable read only memory (EEPROM). Alternatively, raw packet buffer can be a linked list of data structures, where each data structure corresponds to the contents of a particular raw packet. In short, any storage medium (e.g., hardware, software, firmware) that provides addressable or otherwise indexable content can be used to effect raw packet buffer 205.

Figure 2B:
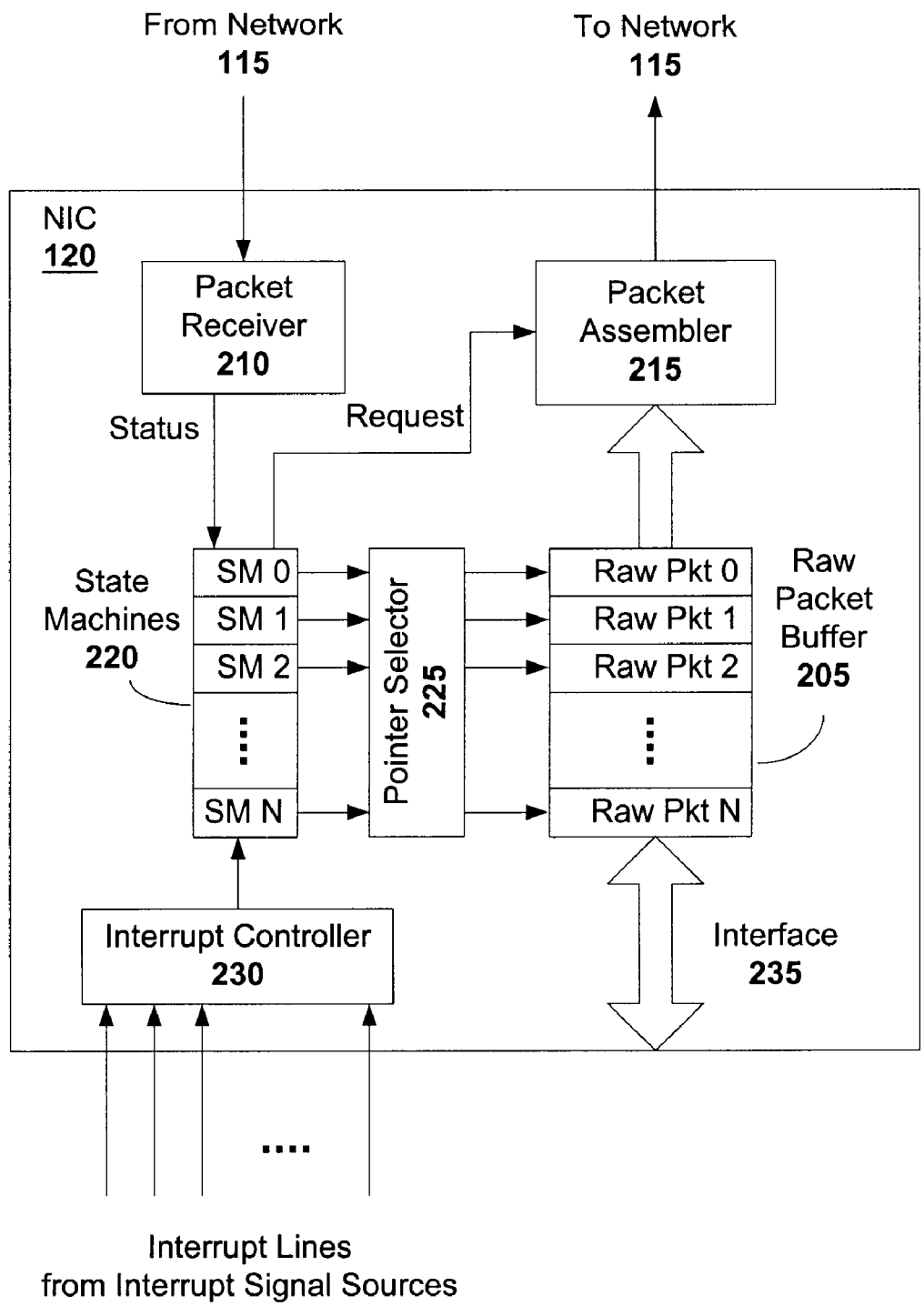
FIG. 2b is a detailed block diagram of a remote network interface system in accordance with one embodiment of the present invention.

FIG. 2b is a detailed block diagram of a remote network interface system in accordance with one embodiment of the present invention. This embodiment of NIC 120 includes raw packet buffer 205, packet receiver 210, packet assembler 215, a number of state machines 220 (e.g., SM 0, SM 1, SM2, SM N), pointer selector 225, interrupt controller 230, and an interface 235 to the packet preparation means. Each of these components can be implemented, for example, in hardware, software, firmware, or any combination thereof. The components may be physically implemented independent of each other (e.g., individual modules or integrated circuits), or physically implemented together on the likes of a single integrated circuit or a chip set.

Packet receiver 210 receives packets from the network (referred to as network packets), extracts information from the packets, and makes that information generally available to NIC 120. In the embodiment shown, the information extracted from the network packets includes status information. This status information is then provided to state machines 220 via a status output. The status output of packet receiver 210 may indicate, for example, a status of normal, error or retry. Normal indicates that a previous raw packet transfer was successful, and that there is currently no abnormal condition. A status of error or retry, however, indicates that a previously transferred raw packet was rejected. An error status specifies that a previously launched raw packet was flawed or otherwise associated with an error condition, while a retry status specifies that the destination node of a previously launched raw packet was busy or unavailable. In either case, the interrupt request can be attempted a number of times until its transfer is successful and acknowledged. Counters can be employed by state machine 220 to keep track of the number of retries to prevent a perpetual repeat condition.

Interrupt controller 230 is coupled to the interrupt lines from the interrupt signal sources such as IO devices and software applications. Interrupt controller 230 receives interrupt requests and provides that interrupt request to the corresponding state machine 220. For example, if the interrupt line associated with interrupt 2 is received, interrupt controller provides that interrupt request to state machine 220 SM 2. In one embodiment, each interrupt line received by interrupt controller 230 is associated with a state machine 220 (e.g., interrupt line 0 corresponds to SM0, interrupt line 1 corresponds to SM1, interrupt line 2 corresponds to SM2, etc). However, interrupt lines received by interrupt controller 230 may also share a particular state machine 220 (e.g., interrupt lines 0 and 1 may correspond to SM 0). The number of interrupt line/state machine pairs depends on factors such as the diversity of the interrupt signal sources and the varying interrupt requirements associated with the interrupt signal sources.

State machine 220 includes a set of states (e.g., initial state, current state and next state), a set of input events, a set of output events and a state transition function. The state transition function takes the current state and an input event and returns the new set of output events and the next state. In the embodiment shown, the input events to each state machine 220 include the output of interrupt controller 230 and a status output of packet receiver 210. The output events of each state machine 220 include a request associated with the received interrupt request and a number of raw packet selector outputs. The value of the output events and next state depends on the current state of the state machine and the input events. In general, a state machine 220 maps an ordered set of input events into a corresponding set of output events.

In one embodiment, state machine 220 maintains a counter that keeps track of the number of times a raw packet is transferred in response to a particular interrupt request. A raw packet rejected by the host node may have to be re-transmitted, for instance, because of a transmission error or the host node was busy as specified by the status output of packet receiver 210. If a current state of state machine 220 shows that the raw packet has been retried (e.g., due to error or congestion) a maximum allowable number of times, then the corresponding output events and next state will log an error rather than keep retrying the request. Variations on state machine 220 counters will be apparent in light of this disclosure. For example, raw packets rejected for congestion-based reasons can be retried a number of times, while raw packets rejected for error-based reasons might not be retried at all. Rather, an error condition is promptly logged or otherwise made known to a system administrator or user.

Pointer selector 225 translates the raw packet selector output of state machine 220 to an address that identifies the location of the corresponding raw packet in raw packet is buffer 205. The selected raw packet, along with the request associated with the received interrupt signal, are then provided to packet assembler 215. Packet assembler 215 then generates a network packet containing the request associated with the received interrupt signal and the raw packet, which includes the identity of the requesting device. The output of packet assembler 215 is operatively coupled to network 115 thereby allowing the assembled network packets to be transferred to the host node over network 115. Note that network 115 can be a local area network in a home or office, or a wide area network (including the Internet) that spans the likes of several offices or homes.

Interface 235 interfaces the packet preparation means to raw packet buffer 205 of NIC 120. Interface 235 can be, for example, an RS 232C data port that receives prepared raw packets from the packet preparation means. However, other serial port technologies can be used here as well, such as RS-422, RS-423, USB, and IEEE 1394. Parallel port technologies, such as SCSI ports, Centronics-type ports, enhanced parallel ports, and extended capabilities port can also be employed to effect interface 235. In one embodiment, the packet preparation means is a software program running on the host node. This software program can receive interrupt requirement information for each interrupt signal source during a configuration session (e.g., when each interrupt signal source is added or otherwise introduced to the system). The prepared raw packets can then be provided to raw packet buffer 205 via interface 235.

In an alternative embodiment, interface 235 can be a packet receiver that receives network packets containing the prepared raw packets. The raw packets are extracted from the received network packets and then provided to raw packet buffer 205. In one such embodiment, interface 235 is included in packet receiver 210, which could be coupled to raw packet buffer 205 and programmed or otherwise configured to extract raw packets from network packets received from network 115. The extracted raw packets can then be provided to raw packet buffer 205 by packet receiver 210.

Figure 3A:
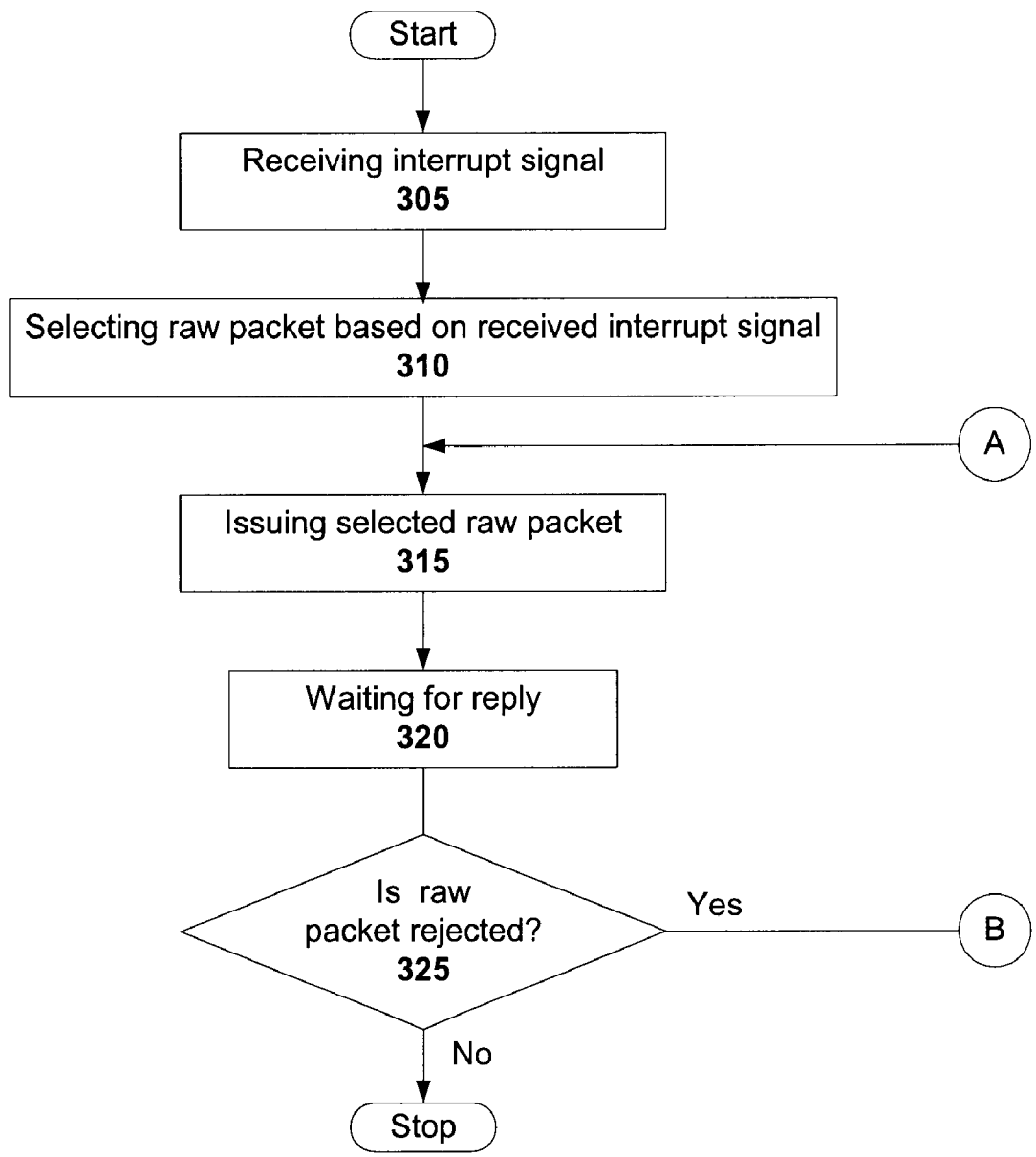
FIGS. 3a and 3b are flowcharts illustrating a method for processing a remote interrupt signal in accordance with one embodiment of the present invention.
Figure 3B:
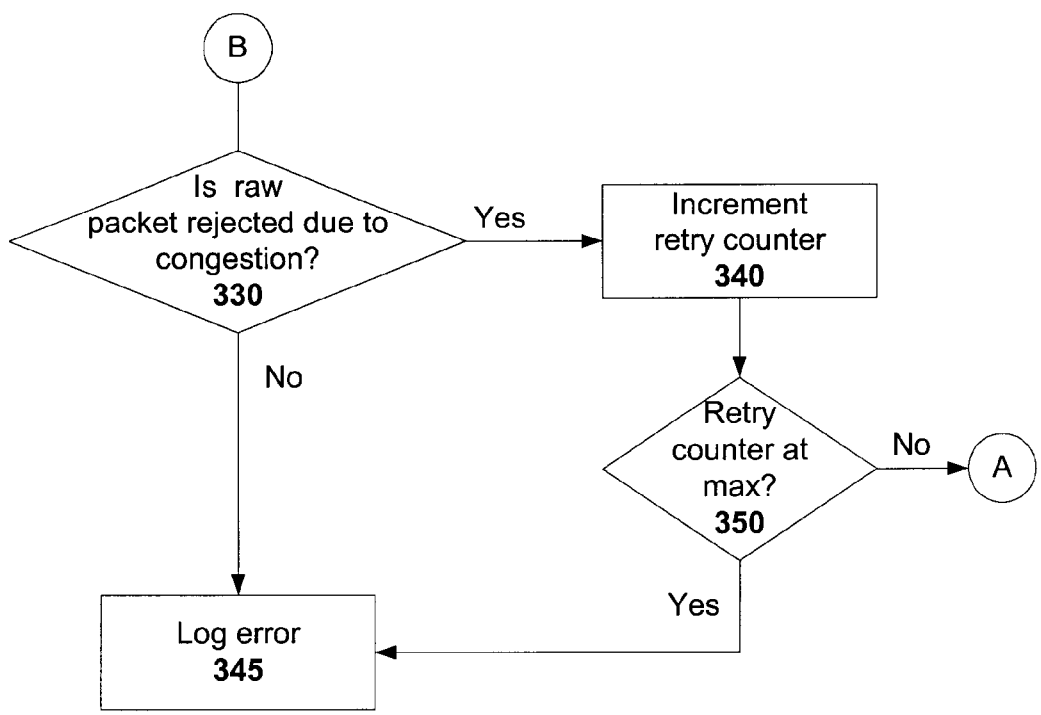

FIGS. 3a and 3b are flowcharts illustrating a method for processing a remote interrupt signal in accordance with one embodiment of the present invention. This method could be carried out, for example, by a state machine such as state machine 220 of FIG. 2b. However, there are a number of processing environments that can be used to effect this method, such as a set of software instructions running on a conventional CPU or microcontroller, and the present invention is not intended to be limited to any one particular embodiment.

The method begins with receiving 305 an interrupt signal from a interrupt signal source, such as an IO device or a software application. The method proceeds with selecting 310 a raw packet based on the received interrupt signal. In one embodiment, if a buffer location containing the corresponding raw packet is busy or otherwise unavailable, then the process may include repeating the selecting step a number of times until the raw packet associated with the received interrupt signal is available. The raw packet contains information that the host node will need in order to process or respond to the interrupt request, such as the identity of the requesting device or event.

The method further includes issuing 315 the selected raw packet. In one embodiment, the selected raw packet is embedded into a network packet and transferred across a network to the host node. The network packet may also include other information such at the address or identity of the intended recipient and the request, command or instructions associated with the received interrupt signal. The method may also include waiting 320 for a reply from the host. This reply may, for example, indicate that the network packet including the selected raw packet was received and responded to accordingly. Alternatively, the reply may indicate that the successful transfer of the network packet failed due to congestion (e.g., the host node was busy) or error (e.g., malformed packet).

In one embodiment, the method further includes determining 325 if the issued raw packet was rejected. This determination can be based, for example, on a reply received from the host node. The method may further include determining 330 if the issued raw packet was rejected due to congestion. If the issued raw packet was rejected due to congestion, then the method may include incrementing 335 a retry counter. The retry counter provides a means for keeping track of how many times a particular raw packet has been issued in response to a particular interrupt request. In such an embodiment, the method may further include determining 340 if the retry counter is at its maximum allowable value. If the retry counter is at its maximum allowable value, then no more retries will be attempted. Rather, the method proceeds with logging 340 an error.

If, on the other hand, the raw packet was not rejected due to congestion, but for some other reason, then the method can proceed with logging 340 an error. In this case, the packet may have been rejected, for example, due to a malformed packet. In addition, a maximum amount of time passing without any reply from the host node can indicate a time-out condition. In this case, the method may include manifesting a time-out condition by logging a time-out error or displaying a time-out message. Note that in alternative embodiments, there can also be a retry counter for non-congestion related failures thereby allowing a number of retries in the event of such failures.

The foregoing description of the embodiments of the invention has been presented for the purposes of illustration and description. It is not intended to be exhaustive or to limit the invention to the precise form disclosed. Many modifications and variations are possible in light of the above teaching as will be understood by those skilled in the art.

For example, the functionality of NIC 120 can be implemented with a microcontroller unit (MCU), where interrupt lines from interrupt signal sources could be coupled to IO ports of the MCU. The MCU could include a processor capable of executing a set of instructions stored in a non-volatile memory included in the MCU. This memory could also be used to store raw packet buffer 205. The instructions could carry out the functionality of the likes of state machine 220, packet receiver 210, packet assembler 215, and pointer selector 225. Raw packet buffer 205 could also be implemented by software-based memory. The MCU could also include data port resources (e.g., USB or RS 232 C) for effecting interface 235. In short, the technology employed for effecting the functionality of the present invention depends on factors such as targeted implementation costs, the complexity and diversity of the interrupt signal sources, and the characteristics of the network over which raw packets are launched in response to remote interrupts.

What is claimed is:

1. A method for processing a remote interrupt signal, the method comprising:
    storing a plurality of raw packets in a raw packet buffer, each raw packet including an identity of an interrupt signal source;
    receiving an interrupt signal from a first interrupt signal source at a remote node;
    selecting a raw packet from the raw packet buffer based on the received interrupt signal, the selected raw packet including the identity of the first interrupt signal source; and
    issuing the selected raw packet over the network from the remote node to a host node.

2. The method of claim 1, wherein the first interrupt signal source is an event that occurred at the remote node and the interrupt signal is a manifestation of that event.

3. The method of claim 1, wherein the selecting step further comprises:
    in response to the raw packet associated with the received interrupt signal being unavailable, repeating the selecting step a number of times until that raw packet is available.

4. The method of claim 1, wherein the issuing step is accomplished by:
    embedding the selected raw packet into a network packet and transferring the network packet across the network to the host node.

5. The method of claim 4, wherein the network packet includes an address associated with the host and a request associated with the received interrupt signal.

6. The method of claim 1, further comprising:
    determining a status of the issued raw packet based on a reply received from the host node.

7. The method of claim 1, further comprising:
    in response to the issued raw packet having been rejected, incrementing a retry counter.

8. The method of claim 7, further comprising:
    in response to the retry counter being at a maximum allowable value, logging an error.

9. The method of claim 1, further comprising:
    in response to the issued raw packet having been rejected, logging an error.

10. The method of claim 1, further comprising:
    in response to receiving no reply from the host node regarding the issued raw packet, indicating a time-out condition.

11. A system for issuing a raw packet over a network in response to a remote interrupt, the system comprising:
    a host node including a processing unit, the host node operatively coupled to the network and for receiving an issued raw packet; and
    a remote node including a network interface module, an interrupt signal source, and a raw packet buffer for storing a plurality of raw packets, each raw packet including an identity of an interrupt signal source, the network interface module for issuing to the host node a raw packet selected from the raw packet buffer based on an interrupt signal received from the interrupt signal source.

12. The system of claim 11, wherein the remote node includes a number of diverse interrupt signal sources, each interrupt signal source associated with at least one raw packet stored in the network interface module of the remote node.

13. In a remote node, a network interface system comprising:
    a raw packet buffer for storing a number of raw packets, each raw packet containing an identity of a corresponding interrupt signal source, and in response to an interrupt signal source providing an interrupt signal to the network interface system, the network interface system selecting a corresponding raw packet from the raw packet buffer and issuing the corresponding raw packet from the remote node to a host node via a network.

14. The system of claim 13, further comprising:
    a processor having an interrupt signal input operatively coupled to a number of interrupt signal sources, and a raw packet select output operatively coupled to the raw packet buffer, the processor for receiving an interrupt signal from an interrupt signal source, and for selecting a raw packet stored in the raw packet buffer based on the received interrupt signal.

15. The system of claim 14, further comprising:
    a packet assembler having a selected raw packet input and a network output, the packet assembler for embedding the selected raw packet into a network packet and for issuing the network packet across the network to the host node.

16. The system of claim 15, wherein the packet assembler has a request input operatively coupled to a request output of the processor, and the network packet includes a request associated with the received interrupt signal.

17. The system of claim 14, further comprising:
a packet receiver having a network input and a status output, the packet receiver for determining a status of an issued raw packet based on a reply received from the host node.

18. The system of claim 14, wherein in response to an issued raw packet being associated with a status of rejected, the processor increments a retry counter, the retry counter for tracking unsuccessful transfer attempts of the issued raw packet.

19. The system of claim 18, wherein in response to the retry counter being at a maximum allowable value, the processor logs an error.

20. The system of claim 14, wherein in response to an issued raw packet being associated with a status of rejected, the processor logs an error.

21. The system of claim 14, wherein in response to receiving no reply from the host node, the processor indicates a time-out condition.

22. The system of claim 13, wherein the raw packets are prepared in advance at the host node, and the prepared raw packets are provided to the raw packet buffer.

* * * * *